United States Patent [19]

Soma et al.

[11] 4,120,337
[45] Oct. 17, 1978

[54] SAFETY PNEUMATIC TIRE FOR PASSENGER CARS

[75] Inventors: Akio Soma, Musashi-Murayama; Haruro Kawashima, Kodaira; Makoto Yamauchi, Higashi-Murayama; Shoji Tanaka, Higashi-Yamato, all of Japan

[73] Assignee: Bridgestone Tire Company Limited, Tokyo, Japan

[21] Appl. No.: 786,933

[22] Filed: Apr. 12, 1977

[30] Foreign Application Priority Data

Apr. 16, 1976 [JP] Japan .................. 51-43413

[51] Int. Cl.² ................................ B60C 13/00
[52] U.S. Cl. .................. 152/353 R; 152/352 R
[58] Field of Search ........... 152/352 R, 353 R, 209 R

[56] References Cited

U.S. PATENT DOCUMENTS

| 2,572,259 | 10/1951 | Gottschall | 152/353 R |
|---|---|---|---|
| 2,781,815 | 2/1957 | Davis | 152/209 R |
| 3,516,467 | 6/1970 | Sims | 152/353 R |
| 3,517,720 | 6/1970 | Brown | 152/209 R |
| 3,628,585 | 12/1971 | Pace | 152/347 |
| 3,841,373 | 10/1974 | Gilreath | 152/352 R |

FOREIGN PATENT DOCUMENTS

| 2,131,874 | 11/1972 | France | 152/353 R |
|---|---|---|---|
| 791,978 | 3/1958 | United Kingdom | 152/352 |

Primary Examiner—Albert J. Makay
Assistant Examiner—Carl Rowold
Attorney, Agent, or Firm—Sughrue, Rothwell, Mion, Zinn and Macpeak

[57] ABSTRACT

A pneumatic radial tire having a ratio of the radius of curvature of inner surface of crown portion to the maximum width of the tire of 1.2/1 to 2.5/1, and provided at the sidewall portion with an annular protection rib projecting over the entire circumference of the tire and having a specifically limited cross-sectional shape is excellent in the puncture resistance at both of the crown portion and the sidewall portion.

5 Claims, 7 Drawing Figures

FIG_3a
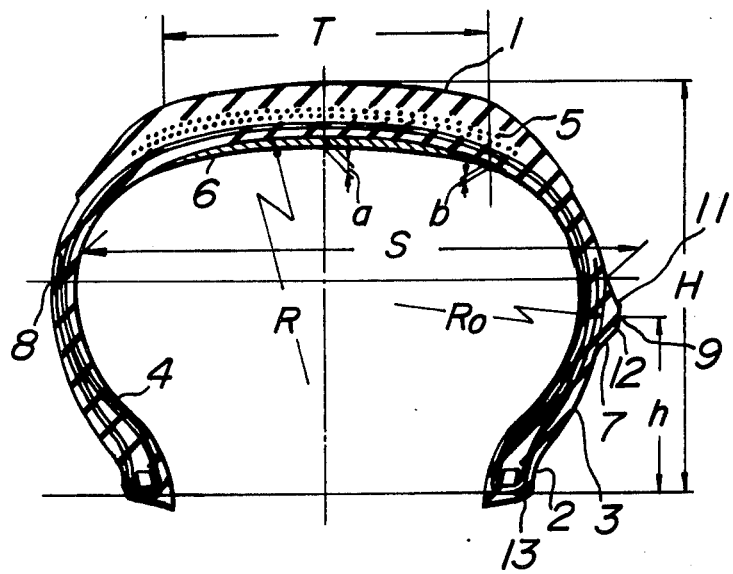
FIG_3b
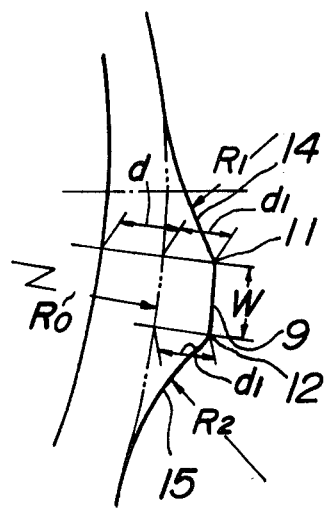

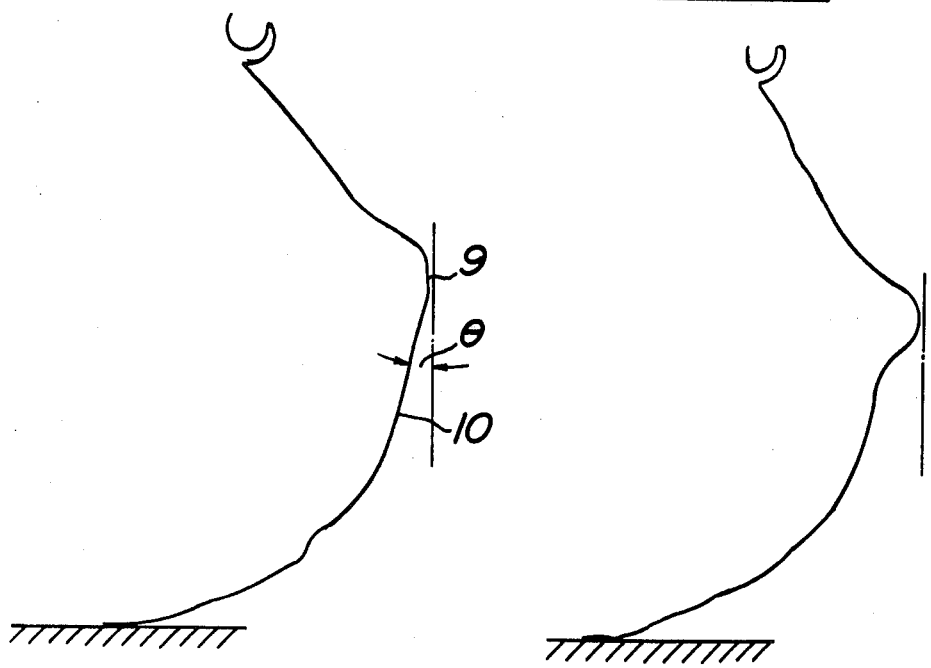
FIG.4a
FIG.4b
PRIOR ART
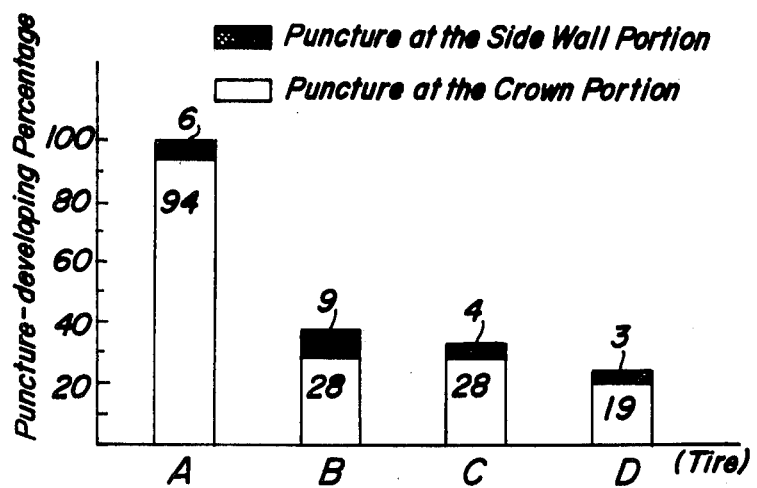
FIG.5

SAFETY PNEUMATIC TIRE FOR PASSENGER CARS

BACKGROUND OF THE INVENTION (1) Field of the Invention:

The present invention relates to a pneumatic tire, and particularly relates to a pneumatic radial tire for passenger cars having an improved puncture resistance.

(2) Description of the Prior Art:

Recently, travelling speed of tires has been increased due to the improved paved roads, high speed roads, etc. and to the improvement of performance of vehicles. Radial tires have recently been used as a tire having improved high speed performance and cornering performance, and stability at high speed. Hence, countermeasures against puncture of radial tires effective a difficult problem for many years in the tire manufacture field, still remain.

Troubles of tires due to puncture have recently been noticeably decreased due to improved paved roads, but the puncture on a high speed road or on a busy traffic area is very dangerous, and the development of tires, which are safe in running, is very important in the tire manufacture field. A tire, which is resistant to puncture comprises a rubberized belt layer containing metal cords embedded therein and has been utilized. Further, a tire having an improved puncture resistance has also been proposed, the tire being a combination of a tire provided on its inner surface with a puncture-sealing layer formed of a viscous rubber composition and a tire having the above described metal cord-containing belt layer.

Other various methods of preventing puncture of tire have been proposed, for example, in Japanese Patent Application Publication No. 6,934/51, No. 5,288/60 and No. 39,453/75 and Japanese Patent Laid Open Application No. 52,704/75 and No. 21,402/75. The tires disclosed in these methods are provided at the inner surface of their crown portion with a viscous rubber puncture-sealing layer (The term "viscous rubber puncture-sealing layer" means a puncture-sealing layer formed of a viscous rubber composition). Such tires have been improved to such an extent that about 70% of punctures at the crown portion due to nail, broken glass piece, screw, etc. are prevented. However, it has been found that such kind of tires have the above described merits, but also have the following defects. That is, there are the following two kinds of punctures.

In a first kind of puncture, which occurs at the contact surface of crown portion with the ground, the the nails, broken glass piece, screws, etc. penetrate into the inner surface of a tire to induce leakage of air, thus producing puncture of the tire. This compresses about 94% of all punctures.

In the second kind of puncture which occurs at the sidewall portion, the number of occurrences of punctures is small, but the puncture occurs when a sidewall portion is subjected to external scratches by sharp stone, rock, etc. The external scratches produced at the sidewall portion lead to bursting of the tire, and hence are very dangerous.

The second kind of puncture is due to the property inherent to radial tires. That is, the sidewall portion of radial tire greatly deforms and is more flexible than the sidewall portion of bias tire. Therefore, punctures started from the sidewall portion occur often in radial tire. Tires provided with a puncture-sealing layer formed of the above described viscous rubber composition on the whole circumference of the inner surface of the crown portion are very effective for preventing the first kind of puncture, but are not effective for preventing the second kind of puncture. When such tires are used, the total number of punctures is smaller than those of conventional tires, but the number of punctures started from the sidewall portion is apt to increase.

The inventors have intended to provide a safety pneumatic radial tire which is free from the above described various drawbacks and has an improved puncture resistance at both of the contact surface of crown portion with ground and the sidewall portion.

That is, the inventors have considered that it is necessary to improve the puncture resistance at the contact surface of crown portion with ground as in the case of conventional tires and at the same time improve the puncture resistance against sharp stone and rock at the sidewall portion. Various investigations have shown that the improvement of puncture resistance at the crown portion in the present invention does not lie in the provision of a completely puncture-free tire, but lies in that, when nail and the like penetrate through the crown portion of a tubeless tire, leakage of air from the surroundings of the nail and the like is prevented, and the sudden leakage of air through the hole formed after the nail and the like have been fallen out is also prevented, whereby the safely travelling state of the tubeless tire is secured. However, it is impossible to seal completely the leakage of air due to the kind of foreign substances, such as nails and the like, the penetrated state thereof, the moving of puncture-sealing layer caused by the heat accumulation during the running and the shape of tire. Also, the tire sometimes continues to run under such a state that air pressure in the tire is lower than the defined air pressure of initially set air pressure. As the result, it has been found that the sidewall portion deforms more and more and the scratches at the sidewall portion due to sharp stone and rocks are apt to increase. That is, the effect of improving the puncture resistance is not fully developed. Further, an experiment shows that, although a conventional puncture-sealing layer is effective for the puncture resistance at the crown portion, the layer often moves to the middle portion of crown portion due to the heat accumulation and centrifugal force during the running of tire and the puncture resistance thereof is decreased, and the balance of the tire is lost.

The inventors, based on the above described phenomena, have investigated the proper inner shape of crown portion, on which a puncture-sealing layer is arranged, as a means for preventing the moving of the layer, and proper shape and position of a protection rib as a means for preventing puncture starting from the sidewall portion.

SUMMARY OF THE INVENTION

The object of the present invention is to provide a safety pneumatic radial tire for passenger cars having an improved puncture resistance at both the contact surface of crown portion with ground and the sidewall portion.

A feature of the present invention is the provision of a safety pneumatic radial tire for passenger cars comprising a pair of bead cores, a pair of sidewall portions and a tread portion extending across the two sidewall portions. At least one carcass ply, containing cords embedded therein extends across the two bead cores in the radial or substantially radial direction and a belt reinforcing layer is arranged between the outside of the carcass ply and the tread portion. A viscous rubber puncture-sealing layer is arranged on the inner circumferential surface of the crown of the tread portion. The improvement of this invention comprises (a) the ratio R/S of the radius R of curvature of the inner surface of the crown portion to the maximum width S of the tire exclusive of protection rib being 1.2/1 to 2.5/1, and (b) at least one side of the sidewall portions is provided with an annular protection rib projecting over the entire circumference of the tire. The protection rib has a substantially trapezoidal cross-sectional shape, the vertical height of the middle position of the outer end and the inner end of the protection rib from the bead base portion being lower than the maximum width position of the tire and being at least 35% of the height of the cross-section of the tire the outer end of the protection rib is extended towards the shoulder portion and the inner end of the protection rib is extended towards the bead portion through concave-shaped curved surfaces, respectively.

BRIEF DESCRIPTION OF THE DRAWINGS

FIG. 3a is a cross-sectional view of a radial tire provided with a protect rib of the present invention and a puncture-sealing layer;

FIG. 3b is a partly enlarged cross-sectional view of the protection rib of the tire shown in FIG. 3a;

FIG. 4a is a diagrammatic view illustrating the cross-sectional shape of a tire provided with the protection rib of the present invention when the tire is in contact with ground;

FIG. 4b is a diagrammatic view illustrating the cross-sectional shape of a tire provided with a conventional protection rib when the tire is in contact with ground; and FIG. 5 is a graph illustrating the developing percentage of punctures in conventional tires as compared with those in tires according to the present invention.

DETAILED DESCRIPTION OF THE PREFERRED EMBODIMENTS

The inventors have found that the puncture resistance of pneumatic radial tire is highly influenced by the shape of inner surface of the tire and the shape and position of the protection rib. An explanation will be made with respect to (I) the shape of inner surface of tire and (II) the shape and position of protection rib hereinafter.

Figure 1:
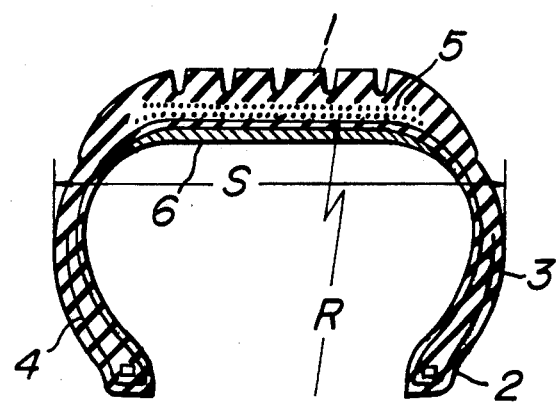
FIG. 1 is a cross-sectional view of a conventional radial tire provided at the inner surface of the crown portion with a puncture-sealing layer.

(I) Shape of inner surface of tire:

The puncture-sealing layer moves due to the above described heat accumulation, centrifugal force, etc. during the running of tire, and the sealing range thereof is decreased. The inventors have found that this phenomenon is influenced by the shape of tire, that is, the radius R of curvature of the inner surface of the crown portion 1, on which a puncture-sealing layer 6 is arranged as shown in FIG. 1. After various investigations, the inventors have found that, in a tire using a viscous rubber composition as a puncture-sealing layer, the ratio R/S of the above described radius R of curvature to the maximum width S of the tire exclusive of protection rib (when the tire is united with rim under standard internal pressure) is effectively 1.2/1 to 2.5/1, preferably 1.6/1 to 2.1/1. When the ratio is smaller than 1.2/1, the puncture-sealing layer moves towards the center portion of the crown due to the centrifugal force and the like, while when the ratio is larger than 2.5/1, the cross-sectional shape of the inner surface of the crown portion deforms inwardly when the tire is in contact with ground and the puncture-sealing layer is subjected to a tensile stress at the center portion of the crown, resulting in the lowering of the effect as a puncture sealing layer. That is, in the tires having such a shape that a tire aspect ratio (ratio of the height H of the cross-section of the tire to the width S thereof exclusive of the protection rib) is not larger than 0.82, tires having the above described R/S ratio are preferable. In this case, it is preferable that the material of the belt is formed of steel cords.

Figure 2:
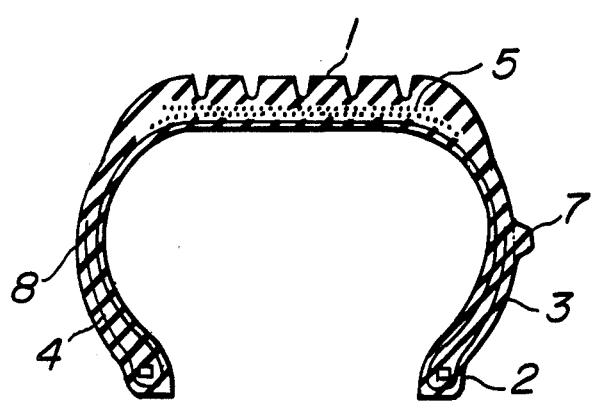
FIG. 2 is a cross-sectional view of a radial tire provided with a conventional protection rib.

(II) Shape and position of protect rib:

Various protection ribs arranged on the sidewall portion have been commonly known. The inventors have made various investigations with respect to the shape and position of protection rib in order to reinforce effectively the sidewall portion without noticeable weight increase of tire, and have found that the following three problems occurs when a protection rib 7 is arranged at a position shifted to the crown portion from the maximum width portion of tire as shown in FIG. 2.

(1) Durability:

In a tire, strain is the largest at an area ranging from its maximum width portion to its shoulder portion. When a protection rib is arranged on this area, sudden rigidity variation in this area causes local change in thickness at a position, at which the thickness is changed, and stress is concentrated to the position thereby inducing cracks on the outer surface of the sidewall portion 3 and separation failure at the upper end of the turn up portion of the carcass ply, and hence lowering the durability of the tire.

(2) Ride feeling against vibration:

Vibration of a radial tire is absorbed by the flexibility of the sidewall portion. When a protection rib is arranged near the maximum width portion of a tire, the deflection area of the sidewall portion becomes substantially narrower, and the ride feeling against vibration becomes uncomfortable.

(3) Manufacturing technique:

The side wall thickness is thin at the area extending from the maximum width portion of a tire to the shoulder portion thereof. When a protection rib is arranged on this area, the amount of rubber is locally increased in this portion, and defective tires are sometimes produced due to the poor moving of the rubber during the vulcanization.

Accordingly, the inventors have investigated with respect to the shape and position of a protection rib, which can solve the above described problems and protect effectively the sidewall portion, and found that the protection rib as shown in FIGS. 3a and 3b is excellent.

Referring to FIGS. 3a and 3b, the protection rib 7 of the present invention is an annular projection arranged on at least one side of sidewall portions extending over its entire circumference coaxially with the rotary axis of the tire, and has a substantially trapezoidal cross-sectional shape. The outer end 11 of the protect rib 7 is extended from the sidewall portion adjacent to the crown portion towards the shoulder portion through a concave-shaped curved surface 14. The inner end 12 of the protect rib 7 is extended from the sidewall portion adjacent to the bead portion towards the bead portion through a concave-shaped curved surface 15. It is necessary that the radius $R_1$ of the concave-shaped curved surface 14, which extends from the outer end 11 of the protection rib towards the shoulder portion, and the radius $R_2$ of curvature of the concave-shaped curved surface 15, which extends from the inner end 12 of the protection rib towards the bead portion, should have a relation of $R_1 \geq R_2$. The reason why $R_1$ must be not smaller than $R_2$ is that, since the concave-shaped curved surface 14 is near the deflection area, vibration in the sidewall portion is absorbed in the curved surface 14 and the curved surface 14 is free from sudden rigidity deformation in order to prevent the development of cracks on the outer surface of the sidewall portion due to the stress concentration.

Referring to FIG. 3, an explanation will be made with respect to the position and dimension of the protection rib.

(a) Position:
The vertical height $h$ of the middle position of the outer end 11 and inner end 12 of the protection rib from the bead base portion 13 must be lower than the height of the maximum width position 8 of the tire and must be at least 35% of the height H of the cross-section of the tire ($h/H \geq 0.35$).

(b) $R_0$ and $R_1$ must satisfy the following relation.

$3.0R_0 > R_1 > 0.5R_0$, preferably $2.0R_0 > R_1 > 1.5R_0$, where $R_0$ is a radius of curvature of sidewall portion near the maximum width position of tire.

(c) $d_1$ and $d$ must satisfy the following relation.

$0.7 \leq d_1/d \leq 1.4$, preferably $1.1 \leq d_1/d \leq 1.2$, where $d$ is the thickness of the sidewall portion, and $d_1$ is the height of the protection rib.

(d) W and $d$ must satisfy the following relation.

$0.5 \leq W/d_1 \leq 1.2$, preferably $0.8 \leq W/d_1 \leq 1.0$, where W is the upper width of the protection rib.

The above described various dimensions are ones after a tire is united with rib and standard internal pressure is applied therein.

The reason why the position and dimension of the protection rib are defined as described above will be explained hereinafter.

The reason why the vertical height $h$ of the middle position of the outer end and the inner end of the protection rib from the bead base portion is limited to at least 35% of the height H of the cross-section of the tire is as follows. When $h$ is less than 35% of H, unless the protection rib is made into a large size, the upper portion of the protection rib does not project beyond the maximum width of the tire, and sharp stones, etc. strike the tire at a position other than the protection rib, and the rib does not serve its function. When the protect rib is made into an excessively large size in order to increase the protecting effect, the weight of the tire is increased, and the durability and other performances of the tire are adversely affected.

The reason why the relation between the radius $R_1$ of curvature of the concave-shaped curved surface 14 of the protection rib and the radius $R_0$ of curvature of the sidewall portion is limited to $3.0R_0 > R_1 > 0.5R_0$ is as follows. When $R_1$ is not smaller than $3.0R_0$, the area of sidewall portion reinforced by the protection rib is too wide, and the weight of the tire is increased and further the rigidity of the whole sidewall portion is increased, resulting in the lowering of the running performance and high speed performance of the tire. When $R_1$ is not larger than $0.5R_0$, sudden rigidity variation occurs in the sidewall portion. Therefore, when the sidewall portion is deformed, stress concentrations occur in the sidewall portion to affect adversely the durability of the tire.

The reason why the ratio of the height $d_1$ of the protection rib to the thickness $d$ of the sidewall portion is limited to $0.7 \leq d_1/d \leq 1.4$ is as follows. When the ratio is smaller than 0.7, the thickness of reinforcing rubber layer in the sidewall portion is too thin, and the protection rib is poor in the protecting ability. When the ratio is larger than 1.4, the weight of the tire is increased and the rigidity of the sidewall portion is noticeably varied, resulting in the lowering of the running performance and durability of the tire.

The reason why the ratio of the width W of the upper portion of the protection rib to the height $d_1$ of the protection rib is limited to $0.5 \leq W/d_1 \leq 1.2$ is as follows. When the ratio is smaller than 0.5, the contact area of the rib with sharp stones becomes small and the protecting effect is poor. When the ratio is larger than 1.2, the weight of the tire is increased and the rigidity of the sidewall portion is noticeably varied, affecting adversely the running performance and durability of the tire.

In the present invention, since the position and shape of the protection rib are defined by the above described formulae, the upper surface 9 of the protection rib is substantially parallel to a plane vertical to the tire ground contact surface, at the maximum width position of the tire even when the tire is in contact with ground, and the protection rib is brought into a surface contact with sharp stone, etc., resulting in a large contact area therebetween. Therefore, the stress is dispersed and the rib is effective as a protective rib. Moreover, the angle $\theta$ of the concave-shaped curved surface 14 extending from the outer end 11 of the protection rib towards the shoulder portion and is inclined with respect to a plane vertical to the tire ground contact surface, is an acute angle, so that even when obstacles contact with the concave-shaped curved surface 14, the obstacles are repelled outwardly.

The following example is given for the purpose of illustration of this invention and is not intended as a limitation thereof.

FIG. 3a shows a structure of a tire of the present invention. The tire has a size of 185/70 HR14, and comprises two carcass plies 4 extending in a direction substantially perpendicular to the circumferential direction of the tire, and two belt reinforcing layers 5 containing metal cords embedded therein and crossed with each other at an angle in the range of 10° to 30° with respect to the circumferential direction of the tire and typically about 20°. The R/S ratio of the radius R of curvature of the inner surface of the crown portion, on which the puncture-sealing layer 6 is arranged, to the maximum width S of the tire exclusive of protect rib is 1.77/1. The position and shape of the protection rib arranged on the sidewall portion are defined by the following formulae:

$$h = 0.43H, \quad R_1 = 1.8R, \quad R_2 = 0.17R_1,$$

$$d_1 = 1.15d \quad \text{and} \quad W = 0.85d_1$$

For the puncture-sealing layer any conventional viscous rubber puncture-sealing layer may be used. However, in the present invention, it is preferable to use, as the layer, a viscous rubber puncture-sealing layer disclosed in Japanese Patent Application No. 157,734/70, which consists mainly of (A) 100 parts by weight of a mixture of 1 to 50 parts by weight of at least one non-polar rubber selected from the group consisting of ethylene-propylene copolymer elastomer, ethylene-propylene-diene terpolymer elastomer, polyisobutylene and isobutylene-isoprene copolymer elastomer, and 99 to 50 parts by weight of polybutene, and (B) 5 to 35 parts by weight of white carbon, and has a viscosity of $2.0 \times 10^3$ to $1.5 \times 10^4$ poises at a temperature of 80° C. and under a shear rate of 100 sec$^{-1}$. In this Example, the layer was formed in the following manner. 250 g of EP 84X (trademark of EPDM made by Japan Synthetic Rubber Co., iodine value 12), 750 g of Polybutene 300R (trademark of polybutene made by Idemitsu Petroleum and Chemical Co., number average molecular weight 1,330, viscosity at 98.9° C. 850 cst.) and 200 g of Nipsil VN-3 (trademark of white carbon made by Nippon Silica Co.) were throughly kneaded by a Brabender, and the resulting viscous rubber composition was diluted with 1,800 g of n-hexane and charged into a tank. The diluted rubber composition, while applying a pressure to the tank, was spray-coated by means of a sprayer on the inner surface of the crown portion over an area of 1.2 times of the tire ground contact width T (under the standard internal pressure and load) along the peripheral direction of the tire so that the resulting puncture-sealing layer has a thickness of about 3.0 mm at the crown center portion and about 1.5 mm at a position corresponding to the end of the shoulder portion contacted with ground. The puncture-sealing layer may be stuck at the molding of the tire or stuck to a vulcanized tire.

FIG. 5 shows comparison of developing percentages of punctures in the following four tires A, B, C and D. The developing percentage of punctures in FIG. 5 is number of punctures of total number of punctures expressed in hundredth when total number of punctures developed in tire A having neither protection rib nor puncture-sealing layer is calculated into 100%.

Tire A: a conventional tire having neither protect rib nor puncture-sealing layer.

Tire B: a tire A comprising a conventional puncture-sealing layer consisting mainly of butyl rubber and a process oil as a softener.

Tire C: a tire B comprising protection rib of the present invention.

Tire D: a tire A comprising the above described viscous rubber puncture-sealing layer of this Example, which consists mainly of EPDM and polybutene, and a protection rib of the present invention.

As seen from FIG. 5, when a puncture-sealing layer is arranged on the inner surface of the crown portion, but a protection rib is not arranged on the sidewall portion (tire B), the developing percentage of punctures at the crown portion is very small, and is about 30% based on the developing percentage of punctures at the crown portion of tire A. However, punctures developed at the sidewall portion of tire B is rather increased as compared with that of tire A. While, in tire C of the present invention, the developing percentage of punctures at the crown portion is about 30% based on the developing percentage of punctures at the crown portion of tire A, and is not substantially different from that of tire B. However, in tire C, the development of punctures at the sidewall portion is noticeably decreased as compared with tire B. Further, in tire D, the development of punctures is noticeably decreased as compared with tire C at both of crown portion and sidewall portion. As described above, the tire of the present invention has a remarkably improved puncture resistance, and is very stable when the tire is running.

What is claimed is:

1. A safety pneumatic radial tire for passenger cars comprising a pair of bead cores, a pair of sidewall portions, a tread portion extending across the two sidewall portions in a ratio R/S of 1.2/1 to 2.5/1, where R is the curvature of the inner surface of the tread portion and S is the maximum width of the tire exclusive of any protection rib, at least one carcass ply containing cords embedded therein and extending across the two bead cores in a substantially radial direction, a belt reinforcing layer arranged between the carcass ply and the tread portion, a viscous rubber puncture-sealing layer arranged on the inner circumferential surface of the tread portion, an annular protection rib on at least one side of the sidewall portions and coaxial therewith, said protection rib having a substantially trapezoidal cross-sectional shape, the vertical height of the middle position of the outer end and inner end of the protection rib from the bead base portion being positioned less than at the maximum width position of the tire therefrom but being at least 35% of the height of the cross-section of the tire, a first concaved surface having a radius of $R_1$, which extends from the outer end of the protection rib towards the tread portion, a second concaved surface having a radius of $R_2$, which extends from the inner end of the protection rib towards the bead portion, and said radii being in a relation of $R_1 > R_2$, and the cross-sectional shape of the protection rib being defined by the following formulae:

$$3.0R_0 > R_1 > 0.5R_0$$

$$1.4 \geq d_1/d \geq 0.7 \quad \text{and}$$

$$1.2 \geq W/d_1 \geq 0.5$$

wherein $R_0$ is the radius of curvature of the sidewall portion located near the protection rib, $R_1$ is the radius of the concaved surface of the protection rib, $d$ is the thickness of the sidewall portion, $d_1$ is the height of the protection rib, and $W$ is the upper width of the protection rib.

2. A safety pneumatic radial tire for passenger cars according to claim 1, wherein said belt reinforcing layer being composed of two layers containing metal cords embedded therein and crossed with each other at an angle of 10° to 30° with respect to the circumferential direction of the tire.

3. A safety pneumatic radial tire for passenger cars according to claim 1, wherein the viscous rubber puncture-sealing layer consists mainly of (A) 100 parts by weight of a mixture of 1 to 50 parts by weight of at least one non-polar rubber selected from the group consisting of ethylene-propylene copolymer elastomer, ethylene-propylene-diene terpolymer elastomer, polyisobutylene and isobutylene-isoprene copolymer elastomer, and 99 to 50 parts by weight of polybutene, and (B) 5 to 35 parts by weight of white carbon, and has a viscosity of $2.0 \times 10^3$ to $1.5 \times 10^4$ poises at a temperature of 80° C. and under a shear rate of 100 sec$^{-1}$.

4. A safety pneumatic tire for passenger cars according to claim 1, wherein the viscous rubber puncture-sealing layer is formed by coating a viscous rubber composition on the inner circumferential surface of the crown portion of a vulcanized tire.

5. A safety pneumatic tire for passenger cars according to claim 1, wherein the aspect ratio of the tire is not larger than 0.82.

* * * * *